United States Patent Office 2,874,982
Patented Feb. 24, 1959

2,874,982

SEAL FOR RELATIVELY ROTATABLE PARTS

Martin P. Winther, Gates Mills, Ohio, assignor to Eaton Manufacturing Company, Cleveland, Ohio, a corporation of Ohio Application March 25, 1954, Serial No. 418,514

4 Claims. (Cl. 286—10)

This invention relates to electromagnetic clutches of the type employing flowable magnetic materials and more particularly to sealing means therefor.

Broadly the invention comprehends the provision of sealing means, for electromagnetic clutches, brakes, or the like, employing flowable magnetic materials, effective to prevent the escape of any and all constituent elements included in the material from the operating confines of the material within the clutches.

With the advent of flowable magnetic materials as power transmitting mediums for electromagnetic clutches, or the like, it has become essentially necessary to prevent the escape of said mixture from between relatively rotatable parts of the clutches in which they are employed. Furthermore, with the increase in size of the clutch units, and the service to which applied, in which said materials are employed, and in view of the variations in the constituent elements going to make up said materials, seals heretofore employed have become inadequate to serve in a manner necessary to maintain efficient operation of the clutches over prolonged periods of operation. It has thus been determined advisable as evidenced by this development to utilize means operating on a centrifugal air pressure theory for the purpose of effectively preventing the escape of said flowable magnetic materials from confinement between relatively rotatable parts of the clutches in which they are located.

Among the several objects of the invention is the provision of sealing means for an electromagnetic clutch, brake or like mechanism, hereinafter to be referred to generally as clutches, employing a flowable magnetic material, that;

a. Is effective to prevent the escape of the material from between relatively rotatable parts of the clutch;

b. Provides for the constant slow movement of air inwardly of the clutch at an annular clearance space between relatively rotatable parts of the clutch near the axis thereof and thus cause a centrifugal force by reason of the air flow, effective to prevent escape of the material at the clearance space;

c. Provides a slow constant movement of air in a path in and out of communication between relatively rotatable parts of the clutch effective to provide a centrifugal force acting to prevent escape of the material or any of the constituent elements thereof while at the same time permitting of a continuous air flow in the path established therefor, such that a continuous venting of the chamber, for the material between the relatively rotatable parts, is provided; and, d. Includes opposing radial vane fans, mounted on opposite sides of an end closure for the clutch and having air flow communication with one another, effective to provide for constant air flow inducing a centrifugal force acting to prevent escape of the magnetic material through an annular clearance space, provided between relatively rotatable parts of the clutch, and having atmospheric communication externally of the clutch.

Other objects and advantages of the invention will appear from the following description taken in connection with the drawings forming a part of the specification, and in which.

Similar reference characters indicate corresponding parts throughout the several views of the drawings.

Figure 1:
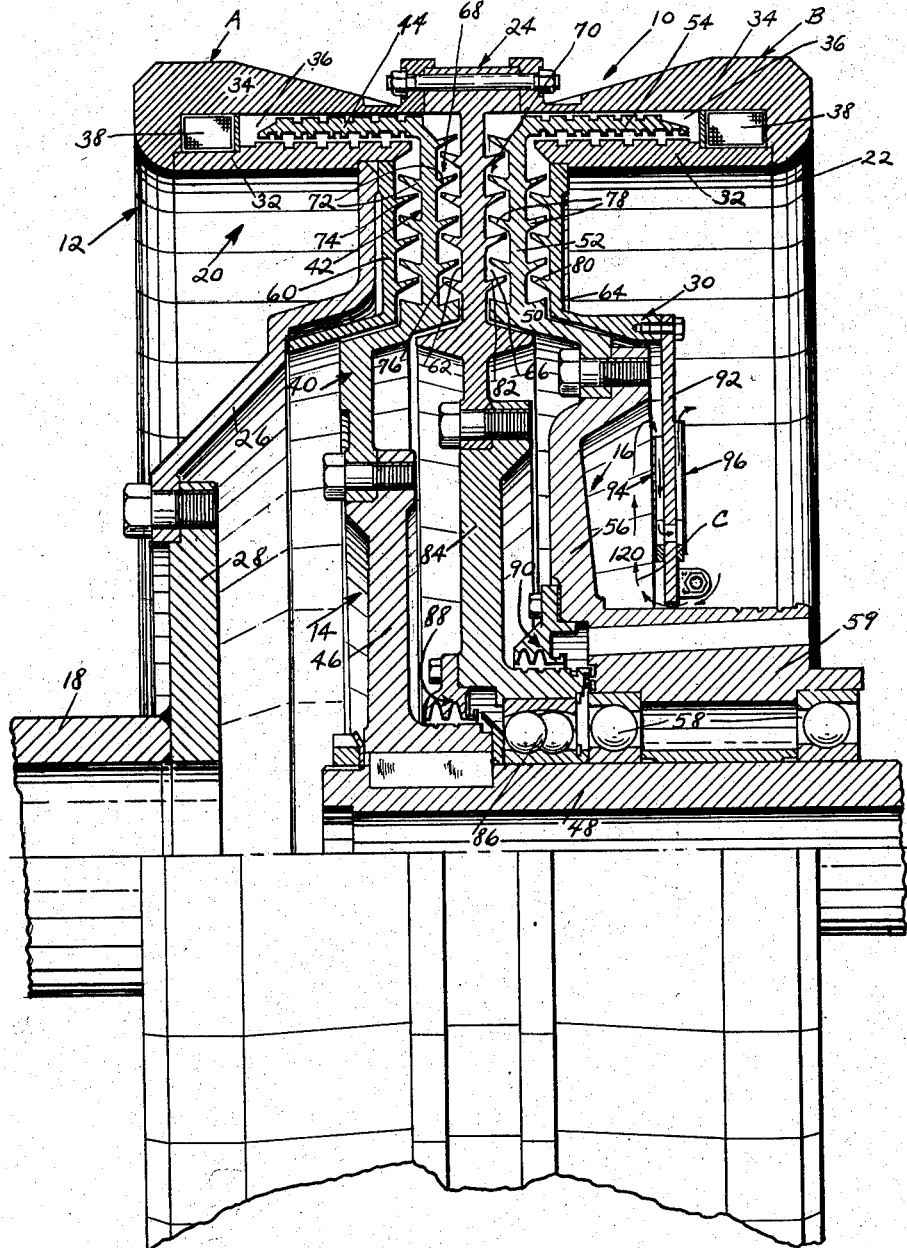
Fig. 1 is a partly broken away vertical cross-sectional view of an electromagnetic drive embodying the invention.
Figure 2:
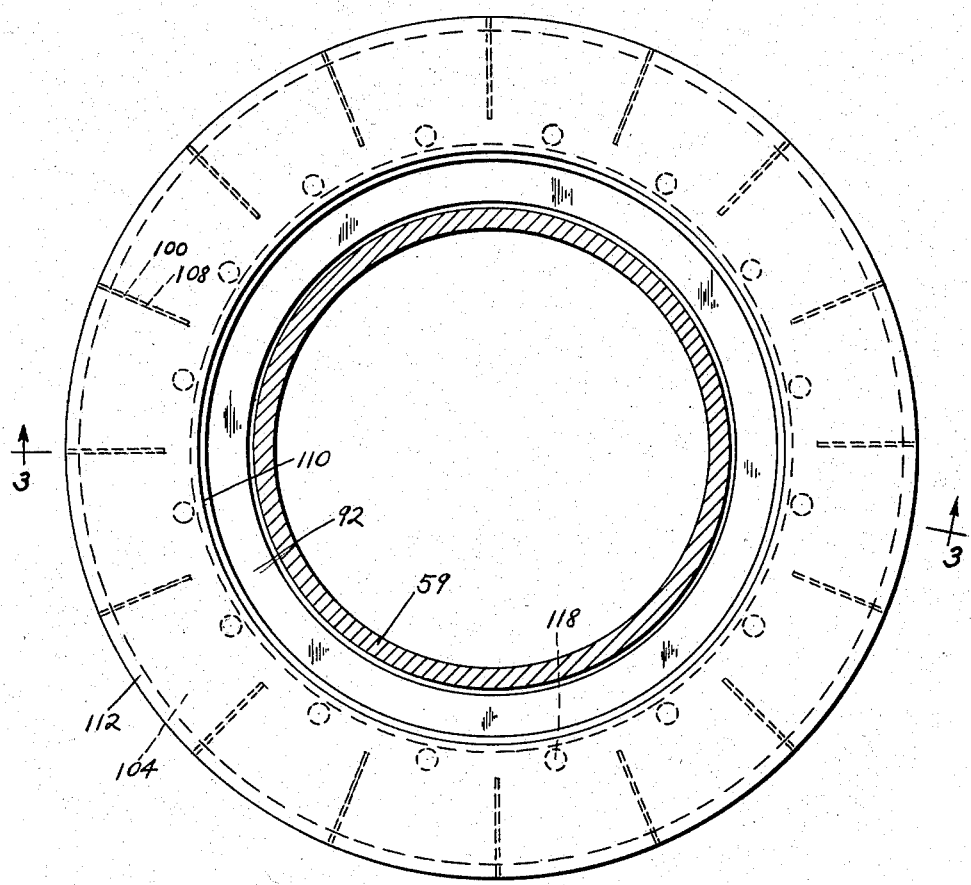
Fig. 2 is a cross-sectional view taken substantially along lines 2—2 of Fig. 1; and, Fig. 3 is a partly broken away enlarged cross-sectional view of the sealing means incorporated in the drive of Fig. 1.
Figure 3:
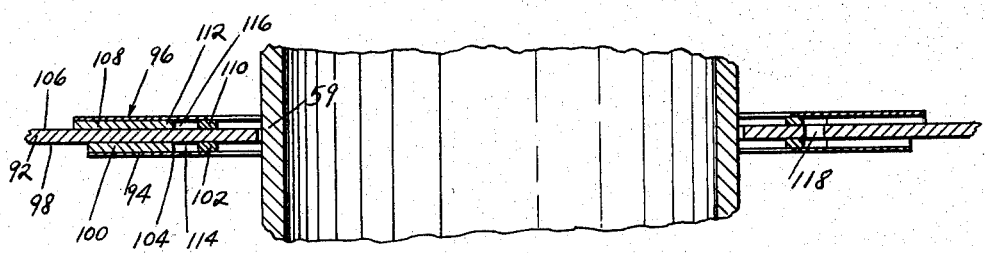

The sealing means presented herein, for use with electromagnetic clutches of the type utilizing flowable magnetic materials of the dry powder variety, was devised primarily for use with large size clutches as a means for preventing the loss of any of the material or constituent elements used in any one clutch. It has become extremely important and more so in large size clutches to inhibit the loss of any of the magnetic material so employed to positively assure the continued operation of the clutches. Furthermore, with the addition of various dry lubricants and anti-sintering agents to various basic magnetic powder metals or metallic alloys, constituting the aforesaid magnetic materials, it is essentially important that the additives as well as the basic powder metal or metallic alloys be prevented from leaking from its predetermined confines between relatively rotatable parts of a clutch in which used. This is emphasized by reason of the fact that many of the additives now being employed are extremely fine on the order of a few microns. None of the sealing means employed prior hereto has proven entirely satisfactory to prevent leakage of said additives.

The sealing means herein is based on the principle of creating a centrifugal force of air flow in a radial outward direction acting to maintain the magnetic material away from an annular space provided between relatively rotatable parts of a magnetic clutch, and which space provides communication between the material chamber of the clutch and the atmosphere externally of the clutch. As a means of creating the centrifugal air flow force, the sealing means includes a pair of radial vane fans, one mounted on each side of an end closure plate, for the clutch, adjacent the annular clearance space. These fans are of unlike diameter and have communication with one another through the end plate at an inner diameter of their respective vanes so as to provide for a predetermined path of air flow through the clearance space into the material chamber, radially outwardly in the chamber from the clearance space and thence in series through the fans, whereby the larger diameter fan draws the air radially inwardly through the smaller diameter fan and then expels the air radially outwardly to the atmosphere. Because of the centrifuging action of the fan located adjacent the material chamber and the slow movement of air through the fans the material or any of the elements thereof will be prevented from moving with the air, whereas the air being lighter than the material or any of the elements thereof will move freely in its prescribed path.

Referring to the drawings for more specific details of the invention 10 represents generally a reversing electromagnetic drive of the type more specifically defined and claimed in my co-pending application Serial No. 366,853, now U. S. Patent No. 2,794,525, issued June 4, 1957, and is presented herein solely as an illustration of a form of apparatus to which the basic invention to be claimed herein is applied.

Drive 10 comprises basically an input or prime mover driven assembly 12, and output assemblies 14 and 16, respectively.

Assembly 12 comprises a shaft 18, a pair of generally annular U-shaped channel assemblies 20 and 22, respectively, secured by one leg of each channel assembly upon a disk or plate 24, near the outer periphery thereof, an end closure plate 26 arranged in secured relation between assembly 20 and a flange 28 of shaft 18, and an end closure plate assembly 30 secured to channel assembly 22.

Shaft 18 constitutes the prime mover or engine driven shaft of the drive 10, which shaft by reason of its connection to channel assembly 20 by way of end plate 26 provides for the rotation of channel assemblies 20 and 22, plate 24 and end plate assembly 30 therewith.

Channel assemblies 20 and 22 each include inner and outer annular magnetic ring members 32 and 34 respectively, secured together at one axial end and open at their opposite axial ends to provide an annular space 36 therebetween. An annular coil 38 is disposed in space 36 of each channel assembly adjacent the closed end of the assembly. Channel assemblies 20 and 22 have one end of rings 34 secured to plate 24 with the open ends of said assemblies facing one another and with plate 24 axially disposed therebetween but with axial clearance between the one end of each ring 32 and an adjacent end face of plate 24.

Output assembly 14 includes an annular magnetic member 40 having an annular radial portion 42 and a ring portion 44, integral with portion 42 at the outer periphery thereof. Portion 42 at its inner periphery is fixedly secured to a hub member 46, with hub member 46 in turn splined to an output shaft 48.

Output assembly 16 similarly to assembly 14 includes an annular magnetic member 50 having an annular radial portion 52 and a ring portion 54, integral with portion 52 at the outer periphery thereof. Portion 50 at its inner periphery is fixedly secured to a hub member 56, which hub member 56 is in turn supported for rotation on axially spaced bearings 58 mounted annularly between the inner periphery of axial sleeve portion 59 of hub member 56 and the outer periphery of shaft 48.

Whereas the ring portion 44 of member 40 is received telescopically in radial spaced relation between ring members 32 and 34 of channel assembly 20 and ring portion 54 of member 50 is received telescopically in radial spaced relation between members 32 and 34 of channel assembly 22, radial portion 42 of member 40 is axially disposed intermediate a washer member 60 secured to end plate 26 and one face 62 of plate 24 and radial portion 52 of member 50 is axially disposed intermediate a washer 64, of end plate assembly 30, and a face 66 of plate 24 axially oppositely disposed to face 62 of plate 24.

The outer circumferential surface of rings 32, and the inner and outer circumferential surfaces of the ring portions 44 and 54 of the respective members 40 and 50 are provided with specific surface configurations, the purposes of which are fully defined and claimed in my co-pending application Serial No. 418,643, filed March 25, 1954, now U. S. Patent No. 2,832,449, issued April 29, 1958.

Labyrinth seal means 68 and 70 of the type generally disclosed in Patent 2,587,077 are provided between the driven assembly 12 and output assemblies 14 and 16.

Seal means 68 includes a plurality of concentric rings 72 arranged on axial opposite faces of portion 42 of member 40 cooperative on one side of portion 42 with concentric rings 74 on washer member 60 and on the other side thereof with concentric rings 76 provided on face 62 of plate 24. Rings 72, 74 and 76 are of such shape and telescoping arrangement with one another as to provide a reasonably effective seal for magnetic fluid material to be carried in space 36 between rings 32 and 34 of assembly 20.

Seal means 70 includes a plurality of concentric rings 78 arranged on axial opposite faces of portion 52 of member 50 cooperative on one side of portion 52 with concentric rings 80 on washer 64 and on the other side thereof with concentric rings 82 provided on face 66 of plate 24. The concentric rings 78, 80 and 82 are so telescopically arranged as rings 72, 74 and 76 of seal means 68 to provide like effective seal means thereto, but with specific regards to magnetic fluid material to be carried in space 36 between members 32 and 34 of assembly 22.

Plate 24 has secured at its inner periphery a hub member 84, which hub member has arranged internally thereof a bearing 86 with the inner periphery of the bearing supported on shaft 48.

Annular sealing means 88 and 90 are provided respectively between hub members 46 and 84, and hub members 56 and 84 effective to inhibit the passage of magnetic fluid material from entering bearings 58 and 86.

Plate assembly 30 includes in addition to washer 64, washer 92 secured at its outer periphery to the inner periphery of washer 64 and with its inner periphery annularly spaced a small distance from the outer circumferential surface of axial sleeve portion 59 of hub member 56, the purpose of which will hereinafter appear.

Secured on axial opposite sides of washer 92 are fan assemblies 94 and 96 respectively, the purpose of which will hereinafter appear.

Fan assembly 94 is secured upon annular face 98 of washer 92 and includes a plurality of equi-circumferentially spaced radial vanes 100, an inner shroud ring 102, and a shroud washer 104 whereas fan assembly 96 is secured upon annular face 106 of washer 92 and includes a plurality of equi-circumferentially spaced radial vanes 108, an inner shroud ring 110 and a shroud washer 112. Fan assemblies 94 and 96 are in all general respects alike but for the fact that the shroud washer and vanes of fan assembly 94 are of a smaller radial length and diameter than the shroud washer and vanes of fan assembly 96. Vanes 100 and 108 of the respective fan assemblies are of a radial length shorter than the respective shroud washers 104 and 112 and have their inner radial ends spaced a like radial distance from their respective shroud rings 102 and 110 so as to provide respective annular spaces 114 and 116 having communication with each other by way of a plurality of equi-circumferentially spaced openings 118 provided through washer 92 of end plate assembly 30.

By so providing the fan assemblies 94 and 96 with vanes of varied diameter and with fan assembly 94 having the smaller diametered vanes an air path of circulation is established upon the rotation of driven assembly 12 and washer 92 forming a part thereof, whereby air is drawn from the atmosphere externally of drive 10 between shaft 48 and the inner periphery of washer 92. As a consequence of the respective fan assembly sizes the air after entering into an annular chamber 120 formed between hub member 56 and washer 92 is first drawn radially outward to the outer periphery of fan assembly 94, thence radially inward through vanes 100 thereof, through space 114 at the inner periphery of vanes 100, through openings 118 in washer 92 into space 116 and thence radially outward to the atmosphere through vanes 108 of fan assembly 96.

Because of the air flow pattern established by reason of the fan assemblies and their arrangement relative to one another and the end closure plate assembly 30, any fluid magnetic material which might escape past the labyrinth seal means 68 and 70 of drive 10, from the spaces 36 of the clutches A and B so formed, is inhibited from passage out of chamber 120 thus providing for the maintenance of all the magnetic material in the drive so as to maintain the predetermined established capacity thereof. Arrows C depict the general path of air flow through the chamber 120 and fan assemblies 94 and 96.

The fluid magnetic material herein utilized and which is to be inhibited from leakage from the drive is of the dry powder variety such for example as magnetic stainless steel powder and various anti-sintering and wear inhibiting additives. Because of the very fine powdered nature of magnetic stainless steel powders as well as the additive powders it has become essentially necessary to safeguard against the loss of any of the powder.

Through the slow movement of air along path C and especially as it enters the outer periphery of fan assembly 94 and moves radially inward therein, any particles of magnetic material present will be centrifuged from entering the fan assembly and prevented from moving with the air column. The air though will not be prevented from moving through the fan assemblies since it is much lighter than the solid particles going to make up the fluid magnetic material.

In view of the arrangement of clutches A and B forming a part of drive 10 and the individual and independent output assemblies 14 and 16 cooperative with the driven assembly 12, the energization of the coils 38, from a source not shown, of the respective assemblies 20 and 22 can provide for independent or simultaneous coupling of the input and output assemblies of clutches A and B with the magnetic fluid material present in spaces 36 linking the cooperative assemblies together as a result of the flow of magnetic flux therebetween.

While the basic invention hereof, that is, the provision of an effective fluid magnetic material sealing means for fluid magnetic clutches, brakes or similar magnetic apparatus including relatively rotatable cooperative elements, is herein disclosed as incorporated in a specific drive 10 it is readily conceivable of its adaptability to other mechanisms, and accordingly therewith the claims appended hereto are interpretative in the light thereof.

What I claim is:

1. A sealing means for effecting a seal between parts at least one of which is rotatable relative to another part about a rotational axis, said parts defining a chamber, said one rotational part including a wall portion having an inner periphery disposed in spaced relationship to the another part to define therebetween a space to be sealed, said space providing communication between the chamber and atmosphere externally thereof, said wall portion having opposed side portions and an elongated fan assembly carried by each side portion, said fan assemblies being of different effective sizes and extending generally radially outwardly relative to the rotational axis from closed end portions adjacent the inner periphery of the wall portion, said wall portion having an opening therethrough adjacent the closed end portions of each fan assembly providing communication therebetween, one of said fan assemblies having the radial outer end portion thereof in communication with the chamber with the other fan assembly being in communication with atmosphere through the radial outer end portion thereof, whereby rotation of said one part induces a substantially centrifugal air flow to seal the space between the parts with the air flow being from atmosphere through the space into the chamber and generally radially outwardly therethrough into the one fan assembly then generally radially inwardly therethrough to the opening and generally radially outwardly through the other fan assembly to atmosphere.

2. A sealing means for effecting a seal between parts at least one of which is rotatable relative to another part about a rotational axis, said parts defining an annular chamber, said one rotational part including an annular wall portion having an inner periphery disposed in annularly spaced relationship to the another part to define therebetween an annular space to be sealed, said space providing communication between the chamber and atmosphere externally thereof, said wall portion having opposed side portions and an elongated fan assembly carried by each side portion, said fan assemblies being of different effective sizes and extending generally radially outwardly relative to the rotational axis from the inner periphery of the wall portion, said wall portion having an opening therethrough adjacent the radial inner end portions of each fan assembly providing communication therebetween, said fan assemblies each including an annular shroud disposed intermediate the space and the opening for closing the radial inner end portion of the respective fan assembly, one of said fan assemblies having the radial outer end portion thereof in communication with the chamber, with the other fan assembly being in communication with atmosphere through the radial outer end portion thereof, whereby rotation of said one part induces a substantially centrifugally air flow to seal the space between the parts with the air flow being from atmosphere through the space into the chamber and generally radially outwardly therethrough into the one fan assembly then generally radially inwardly therethrough to the opening and generally radially outwardly through the other fan assembly to atmosphere.

3. The sealing means as set forth in claim 2, wherein each of the fan assemblies further include a shroud element disposed in axially spaced relationship to the respective opposed side portion of the wall portion relative to the rotational axis, and a vane extending generally radially relative to the rotational axis and disposed intermediate the respective shroud element and the wall portion.

4. A sealing means for effecting a seal between parts at least one of which is rotatable relative to another part about a rotational axis, said parts defining an annular chamber having a dry flowable material therein, said one rotational part including an annular wall portion disposed generally radially relative to the rotational axis with the inner periphery of the wall portion being disposed in spaced relationship to the another part to define therebetween an annular space to be sealed, said space providing communication between the chamber and atmosphere externally thereof, said wall portion having opposed side portions axially spaced relative to the rotational axis and an elongated fan assembly carried by each side portion, said fan assemblies extending generally radially outwardly relative to the rotational axis from the inner periphery of the wall portion with one of the fan assemblies being disposed within the chamber and being of a less effective size than the other fan assembly, said fan assemblies each including an annular shroud ring disposed radially outwardly of the space for closing the radial inner end portion of the respective fan assembly, an annular shroud element disposed in axially spaced relationship to the respective opposed side portion relative to the rotational axis and a plurality of substantially equi-circumferentially spaced vanes extending generally radially relative to the rotational axis and disposed intermediate the respective shroud element and the wall portion with the vanes of the one fan assembly being generally axially aligned with the vanes of the other fan assembly relative to the rotational axis, said wall portion having a plurality of openings therethrough disposed generally radially outwardly of the shroud rings and circumferentially intermediate adjacent aligned vanes to provide communication between the fan assemblies, said one fan assembly having the radially outer end portion thereof in communication with the chamber and the other fan assembly being in communication with atmosphere through the radial outer end portion thereof, whereby rotation of said one part induces a substantially centrifugal air flow to seal the space between the parts and retain the dry flowable material within the chamber with the air flow being from atmosphere through the space into the chamber and generally radially outwardly therethrough into the one fan assembly then generally radially inwardly therethrough to the openings and generally radially outwardly through the other fan assembly to atmosphere.

References Cited in the file of this patent

UNITED STATES PATENTS

| | | |
|---|---|---|
| 958,612 | Eyermann | May 17, 1910 |
| 1,715,597 | Haug | June 4, 1929 |
| 2,587,077 | Winther | Feb. 26, 1952 |
| 2,598,381 | Hoffman | May 27, 1952 |
| 2,631,705 | Winther | Mar. 17, 1953 |
| 2,713,927 | Rabinow | July 26, 1955 |